UNITED STATES PATENT OFFICE.

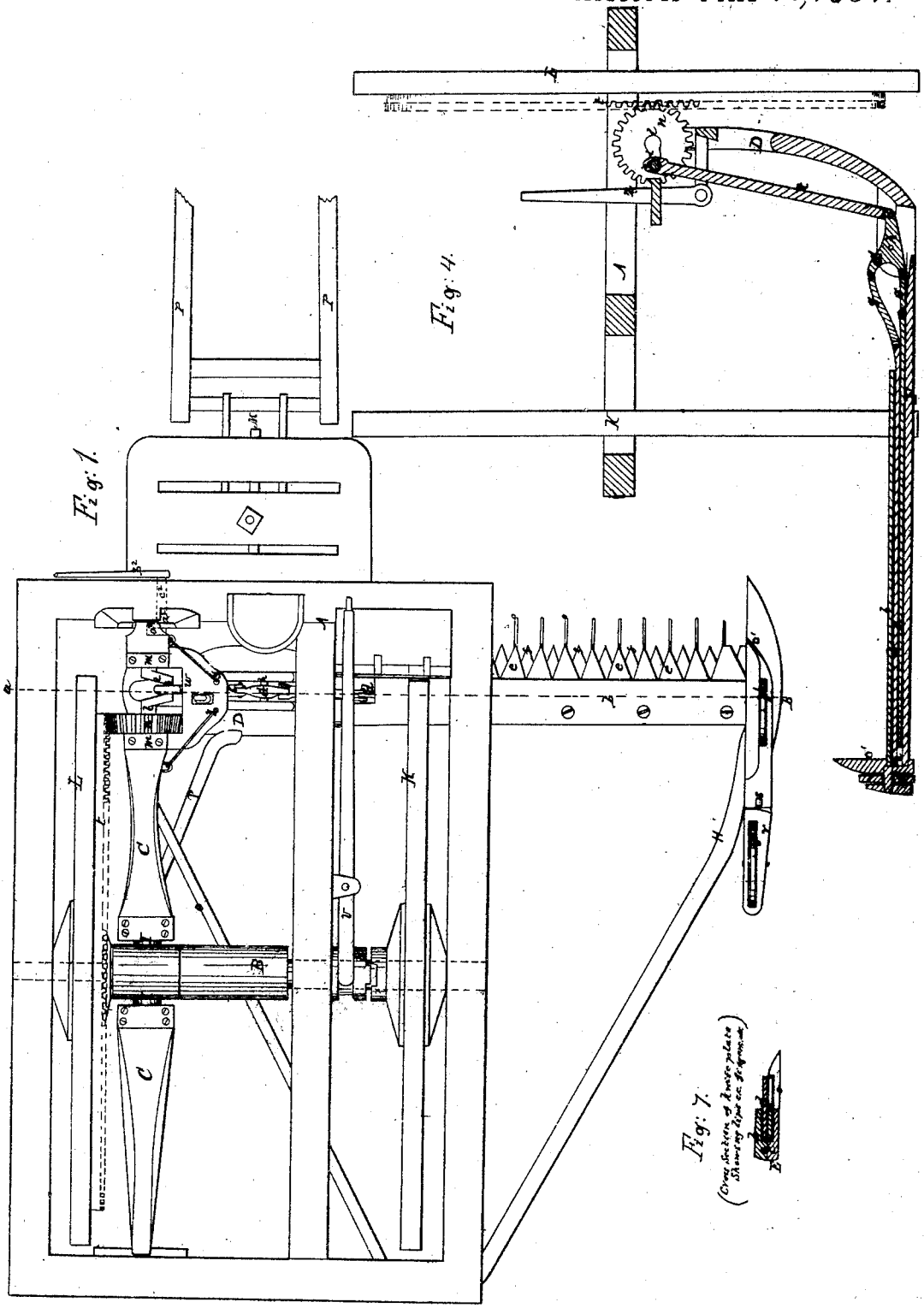

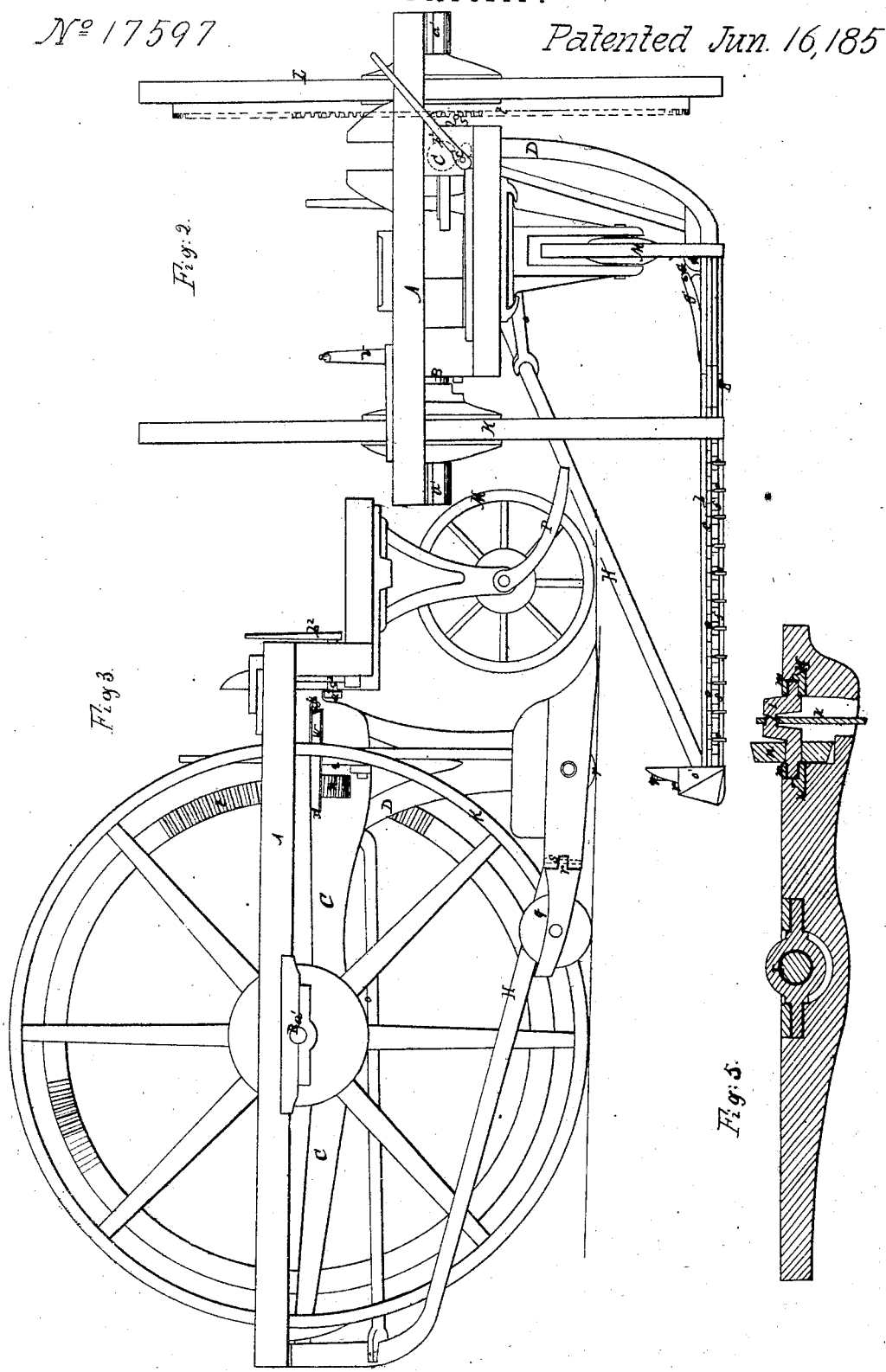

JEREMY B. WARDWELL, OF METHUEN, MASSACHUSETTS.

IMPROVEMENT IN MOWING-MACHINES.

Specification forming part of Letters Patent No. 17,597, dated June 16, 1857.

*To all whom it may concern:*

Be it known that I, JEREMY B. WARDWELL, of Methuen, in the county of Essex and State of Massachusetts, have invented an Improved Mowing-Machine; and I hereby declare that the said machine is fully described in the following specification, and shown in the accompanying drawings, to which the specification and letters refer.

The nature of my invention consists in a peculiar mode of supporting the finger-bar and cutting apparatus of mowing-machines, as will be fully described.

Figure 1 of the drawings represents a top view of my machine; Fig. 2, a front elevation of it; Fig. 3, a side view of it; Fig. 4, a vertical cross-section taken on the line $a\,b$ of Fig. 1; Fig. 5, a cross-section of the rocking beam.

In the drawings, A denotes a truck-frame, to which the driving-wheels and the cutting mechanism are applied. A shaft, B, runs transversely across the truck-frame, and turns in bearings $a'\,a'$, applied to the under side of the frame A.

A longitudinal beam, C, is applied to the shaft B, an arm, D, depending from one end of the beam, said arm having the horizontal plate E attached to and extending from its lower end, as seen in Figs. 2 and 4. This plate is made with a detachable top, $b$, and lips $c\,c$ for the application of the teeth or sickle-bars $d\,d$, which carry and operate said teeth or sickles. (Denoted by $ee$ and $ff$.) The teeth extend from the plate E, as seen in Figs. 1 and 7, and slide horizontally in contact with each other, for which purpose the teeth-bars $d\,d$ are connected to a triangular rocking or vibrating lever, G, by two connecting-rods, $g\,g$, said lever turning on a fulcrum, $h$, and having its rear arm jointed to a bell-crank, $i$, by a connecting-rod, $k$. The bell-crank revolves with a shaft, $l$, turning in suitable bearings, $m\,m$, and having a bevel-gear, $n$, upon it, as seen in Fig. 1. As said gear is rotated and the bell-crank turned a reciprocating vertical motion will be imparted to the rod $k$, which rocks or vibrates the lever G, and thereby imparts reciprocating horizontal movements to the connecting-rods $g\,g$, bars $d\,d$, and knives $e\,e$ and $ff$, one set of knives moving in one direction while the other set moves opposite thereto. Stationary fingers $o\,o$ project from the bottom of the plate E in front of the teeth to separate and direct the grass or grain being mowed. The plate E is connected at its front end, and by a lever or bar, H, to the rear end of the beam C, so as to keep it steady and impart to it the proper strength, cross-bars or ties $o^2\,p$ being applied, as seen in the drawings, for the same purpose. A guide or separator, $o'$, is applied to this end of the bar to press aside the grass, a small wheel, $p'$, being applied underneath it to roll over the surface of the ground and keep the knives up the proper distance from such surface. To the rear end of the guide another wheel or follower, $q$, is applied, the bearing or frame $r$, in which said wheel turns, rocking transversely on a pin, $s$, as seen in Figs. 1 and 3. By applying this follower, made to rock or yield transversely, the guide is more easily run through or over obstructions, so as to prevent strain upon the teeth.

The gear $n$ is operated by a large gear-wheel, $t$, placed on the inside of a driving-wheel, L, applied to the shaft B, said wheel L being made fast to the shaft. Another and similar wheel, K, is applied upon the opposite end of the shaft, said wheel being applied loosely upon the shaft, but so as to be fastened thereto at proper times by a sliding clutch, $u$, operated upon by a hand-lever, $v$, or in any other convenient manner. When the machine is in operation or being driven to or from the field the wheel K is made fast to the shaft, and operates as a power-wheel upon said shaft; but when turning the machine around the wheel is to be unclutched, when it can rotate faster and aid in the turning, as will be readily understood.

The gear-pinion $n$, with its bell-crank and bearings, is applied to a sliding carriage, $w$, sliding in ways $x\,x$, made in the beam C. When, in connection with the gear on the driving-wheel, it is fastened stationarily by hooks $y\,y$ or other suitable contrivances, but when it is not desirable to operate the knives the hooks are unfastened from the carriage and the carriage drawn back by a hand-lever, $z$, or other proper mechanism, in such manner as to draw the pinion away from the gear, or so as not to be operated upon thereby.

The beam C, which supports and carries the knives or sickles, is applied to the wheel-shaft B by a universal joint, as seen at I in Figs. 1 and 5, the latter figure denoting a vertical central section of the beam. By means of this joint so applied the sickle bar or plate is capable of adjusting itself to the contour of the ground over which the machine is passing, and operating both to rise and fall in the direction of the path of the machine, and to tip up and down transversely to said path.

To support the front of the machine in a proper manner, and so as to enable me to lift the knives in passing over obstructions, or to make them inoperative on the grass to be cut for any short distance, when necessary, I apply to the front of the machine an elevating and supporting wheel, M, the said wheel acting, in connection with the driving-wheels, to keep the knives at the proper distance from the surface of the ground. An eccentric or lifting lever, $a^2$, is applied under the front end of the universal beam C, so as to be operated by a hand-lever, $b^2$, attached to the joint-pin $c^2$ thereof. By turning the hand-lever so as to bring the eccentric against the under side of the beam the beam may be tipped so as to lift the knife-bar and knives up and allow them to pass over obstructions, as occasion may require. Suitable shafts, P P, are applied in any proper manner, and so as to operate with one or more horses attached.

The machine thus constructed to operate as described can be built very cheap and strong, and so as to perform the work with much less power, it is believed, than is ordinarily applied to a machine for this purpose. The driving-wheel L, which operates the gear, being made of so great diameter, and having a co-operating driving-wheel, K, applied and fastened to its shaft at proper times to aid it, makes the machine run with great facility, while the action of the knives in cutting together, both moving with the same velocity, insures a quick and effective cut upon the grass.

Having thus fully described my improved mowing-machine, what I claim therein as new and of my invention, and desire to secure by Letters Patent, is—

Supporting the finger-bar and cutting apparatus from the main shaft B, substantially as described.

In testimony whereof I have hereto set my signature this 28th day of March, A. D. 1857.

JEREMY B. WARDWELL.

Witnesses:
CHRISTIE E. BROCK,
CHARLES SHED.